(12) United States Patent
Froeschle

(10) Patent No.: US 8,356,837 B2
(45) Date of Patent: Jan. 22, 2013

(54) ROLL BAR CONFIGURATION FOR A MOTOR VEHICLE, AND MOTOR VEHICLE WITH A ROLL BAR CONFIGURATION OF THIS TYPE

(75) Inventor: Mathias Froeschle, Ostfildern (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 29 days.

(21) Appl. No.: 13/075,875

(22) Filed: Mar. 30, 2011

(65) Prior Publication Data
US 2011/0241326 A1    Oct. 6, 2011

(30) Foreign Application Priority Data
Apr. 6, 2010   (DE) .................. 10 2010 013 975

(51) Int. Cl.
B60R 21/13   (2006.01)
(52) U.S. Cl. ........................................... 280/756
(58) Field of Classification Search ............ 280/756
See application file for complete search history.

(56) References Cited

U.S. PATENT DOCUMENTS

| | | | | |
|---|---|---|---|---|
| 6,557,893 | B2 * | 5/2003 | Sauermann | 280/748 |
| 6,572,145 | B1 * | 6/2003 | Guillez et al. | 280/756 |
| 6,752,422 | B2 * | 6/2004 | Sauermann | 280/748 |
| 7,341,278 | B2 * | 3/2008 | Queveau et al. | 280/756 |
| 2005/0280253 | A1 * | 12/2005 | Queveau et al. | 280/756 |
| 2006/0001248 | A1 * | 1/2006 | Queveau et al. | 280/756 |
| 2010/0078925 | A1 * | 4/2010 | Froschle | 280/756 |

FOREIGN PATENT DOCUMENTS

| | | |
|---|---|---|
| DE | 4017778 A1 | 12/1991 |
| DE | 4119529 A1 | 12/1992 |
| DE | 102005047274 B3 | 1/2007 |
| DE | 102007034826 A1 | 1/2009 |
| DE | 102008025871 A1 | 12/2009 |

OTHER PUBLICATIONS

German Search Report dated Jan. 31, 2011.

\* cited by examiner

Primary Examiner — Toan To
(74) Attorney, Agent, or Firm — RatnerPrestia

(57) ABSTRACT

A roll bar configuration for a motor vehicle has a cross-member and two roll bars which are mounted on the cross-member in respective pivot axes. The roll bars are each formed as a single part and so as to be stiff per se and can be shifted from a retracted inoperative position into an erected protective position about the pivot axes. The pivot axes are disposed—as seen in the direction of the width of the motor vehicle—at a distance from each other on the cross-member. The roll bar configuration, which takes up a small installation space in the direction of the vehicle height is distinguished in that the roll bars are arranged in the inoperative position—as seen in the vertical direction of the vehicle—level with the pivot axes or on the cross-member there above.

11 Claims, 1 Drawing Sheet

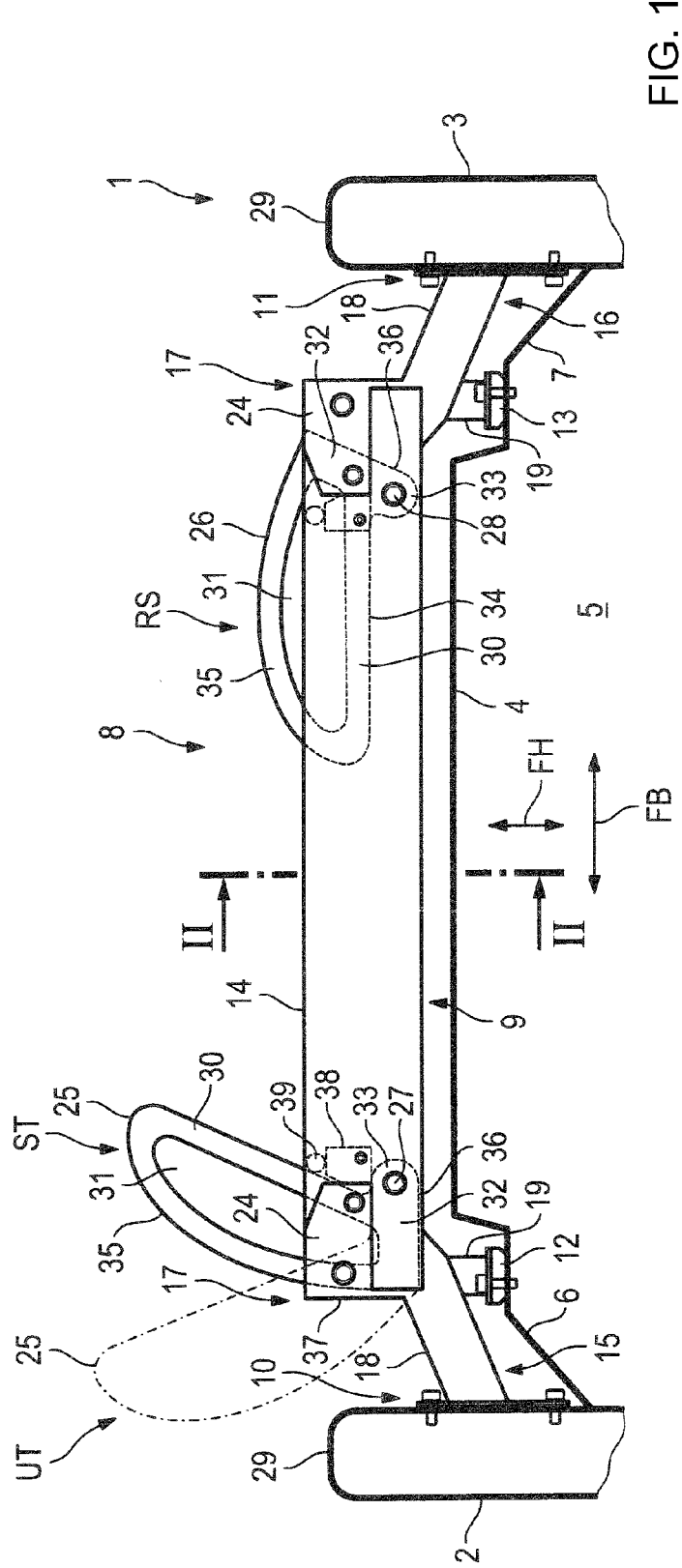
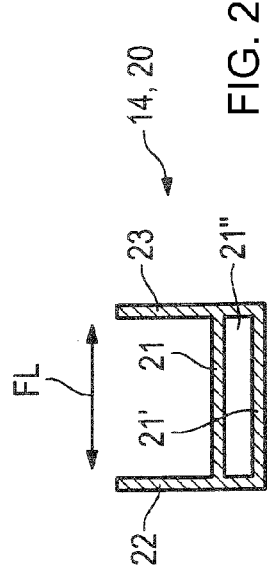
FIG. 1
FIG. 2

ROLL BAR CONFIGURATION FOR A MOTOR VEHICLE, AND MOTOR VEHICLE WITH A ROLL BAR CONFIGURATION OF THIS TYPE

CROSS-REFERENCE TO RELATED APPLICATION

This application claims the priority, under 35 U.S.C. §119, of German application DE 10 2010 013 975.0, filed Apr. 6, 2010; the prior application is herewith incorporated by reference in its entirety.

BACKGROUND OF THE INVENTION

Field of the Invention

The invention is based on a roll bar configuration for a motor.

A roll bar configuration of this type for a motor vehicle is known from German DE 10 2005 047 274 B3. The roll bar configuration contains a cross-member on which two roll bars are mounted, each in a pivot axis, wherein the pivot axis is oriented in the longitudinal direction of the vehicle. The roll bar configuration is therefore arranged transversely in the vehicle, i.e. is oriented in the direction of the vehicle width. The two roll bars are therefore located next to each other. The roll bars can therefore be arranged behind motor vehicle seats, with each of the roll bars being assigned to a motor vehicle seat. According to the prior art, the roll bars are each formed as a single part and are stiff per se. They can be shifted from a retracted inoperative position, in which they are located substantially horizontally in the motor vehicle and below their pivot axis, into an erected protective position. In the process, the roll bars are moved about the pivot axes. The pivot axes for the roll bars are arranged—as seen in the direction of the vehicle width—on the cross-member at a distance from each other.

SUMMARY OF THE INVENTION

It is accordingly an object of the invention to provide a roll bar configuration for a motor vehicle, and a motor vehicle with a roll bar configuration of this type which overcomes the above-mentioned disadvantages of the prior art devices of this general type, which roll bar configuration, in the inoperative position of the roll bars, takes up less space, as measured in the direction of the vehicle height.

With the foregoing and other objects in view there is provided, in accordance with the invention a roll bar configuration for a motor vehicle. The roll bar configuration containing a cross-member and pivot axes disposed—as seen in a direction of a width of the motor vehicle—at a distance from each other on said cross-member. Two roll bars are mounted on the cross-member via the pivot axes. Each of the roll bars are formed as a single part and so as to be stiff per se and can be shifted from a retracted inoperative position into an erected protective position about the pivot axes. The roll bars are disposed in the inoperative position—as seen in a vertical direction of the motor vehicle—substantially level with the pivot axes or on the cross-member there above.

The advantages obtained by the roll bar configuration according to the invention can be considered that the roll bar configuration is distinguished by a low overall height. The roll bar configuration according to the invention can therefore be used even in motor vehicles in which a smaller installation space is available in the vertical direction of the vehicle. The roll bars of the roll bar configuration according to the invention can nevertheless extend to a sufficient height in the protective position.

In one exemplary embodiment, provision is made for each roll bar to have a peripheral, i.e. self-contained contour. A roll bar of this type with a closed contour can be assembled, for example, from tubes and can be produced as a hollow extruded profile, cast part, by machining or from sheet-metal shells. The peripheral, closed contour of the roll bar can have an opening in the center, as is already known for U-shaped roll bars in the prior art. This opening in the roll bar could also be closed.

According to a particularly preferred exemplary embodiment, each roll bar has—with reference to the inoperative position thereof—a lower bar portion which is of rectilinear design whereas an upper bar portion—likewise with reference to the inoperative position—is shaped in an arcuate manner. The roll bar can therefore be configured in the form of a semicircle, as a half oval or half ellipse. This enables the roll bar to be stored low down in the inoperative position.

An exemplary embodiment is furthermore preferred, in which the cross-member is configured in cross section as a U-shaped profile, and therefore, in the inoperative position, the roll bars can be at least partially accommodated by the cross section. Furthermore, in the protective position, each roll bar can be supported by a bar foot on the base of the U-shaped profile. This ensures a secure and stiff support of the roll bar in the protective position.

So that the roll bars in the protective position are not inadvertently moved back into the inoperative position thereof, according to another exemplary embodiment a locking device is provided for the roll bars in the protective position.

An exemplary embodiment is furthermore preferred, in which the pivot angle of each roll bar between the inoperative position and the protective position is >90°. Starting from an approximately horizontal inoperative position of the roll bars, in a development of the invention, an "over-rotated" angular position can therefore be provided for the roll bars in the protective position, i.e., with reference to an imaginary vertical, the roll bars cross over the vertical during the pivoting movement thereof and therefore, in the protective position, take up an over-rotated angular position pointing in the direction of the respectively adjacent vehicle wall. The over-rotated angular position can reduce the strength requirements for the locking device, since, after the motor vehicle has overturned, the forces which act from the outside do not press the roll bars in the direction of the inoperative position but force the roll bars further into the over-rotated angular position.

Furthermore, an exemplary embodiment is preferred, in which the cross-member has lateral fastening brackets which are each fastened at laterally outer ends on the cross-member. The brackets serve to connect the roll bar configuration to the motor vehicle. In addition, the fastening brackets can reinforce the cross-member in the region of the outer pivot axes.

A motor vehicle has a vehicle interior which could also be referred to as a passenger compartment. An engine compartment is arranged there behind. In a preferred embodiment, the motor vehicle is therefore a motor vehicle with a driving engine or motor in a central engine configuration or rear engine configuration. The engine compartment has a lid which at least partially closes the engine compartment upward. In the motor vehicle according to the invention with the roll bar configuration according to the invention, the roll bar configuration, i.e. therefore in particular the cross-member, extends behind the engine compartment, or the roll bar configuration is located above an end wall between the engine compartment and vehicle interior. A motor vehicle of this type has a reduced installation space for a roll bar configuration in the direction of the vehicle height. Nevertheless, with the roll bar configuration according to the invention, the vehicle can be equipped with roll bars which can be moved between an inoperative position and a protective position. Of course, the invention can also be used in a motor vehicle in which a receiving space for luggage and/or for a roof configuration which can be put away is provided behind or below the roll bar configuration. A motor vehicle of this type could have a front or rear engine configuration. The volume for the receiving space could be enlarged because of the roll bar configuration. A pass-through opening between the receiving space and vehicle interior could also be arranged under the roll bar configuration.

Other features which are considered as characteristic for the invention are set forth in the appended claims.

Although the invention is illustrated and described herein as embodied in a roll bar configuration for a motor vehicle, and a motor vehicle with a roll bar configuration of this type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a diagrammatic illustration of a part of a motor vehicle having a roll bar configuration; and FIG. 2 is a diagrammatic, cross-sectional view of a cross-member of the roll bar configuration taken along the line II-II shown in FIG. 1.

DETAILED DESCRIPTION OF THE INVENTION

Of a motor vehicle 1, FIG. 1 illustrates part of the left and right side walls 2, 3 of the motor vehicle bodywork (otherwise not illustrated specifically). The sidewalls 2 and 3 illustrated here are preferably rear side walls which are therefore arranged behind the vehicle doors (not illustrated here) of the motor vehicle. The side walls 2 and 3 therefore have "B pillars" of the bodywork or of the body shell of the motor vehicle 1. A further portion of the bodywork or of the body shell, such as, for example, a non-illustrated floor assembly and a bodywork lid 4 extend between the side walls 2 and 3, wherein the lid 4 in the exemplary embodiment upwardly closes or covers an engine compartment 5, which is located there below, of the motor vehicle 1. The lid 4 can be laterally adjoined on the outside by planar bodywork portions 6, 7 which are arranged between the lid 4 and the respective side walls 2 and 3.

A roll bar configuration 8 which is explained in more detail below is arranged between the side walls 2 and 3 and above the lid 4 or the bodywork portions 6 and 7. For this purpose, in FIG. 1, a double arrow FB also indicates the direction of the vehicle width and a further double arrow FH indicates the direction of the vehicle height. The roll bar configuration 8 has a transverse supporting configuration 9 fastened at the outer ends 10 and 11 thereof to the inner wall of the corresponding side wall 2, 3 or to the respective B pillar. The transverse supporting configuration 9 is furthermore supported on the lid 4 or on the bodywork portions 6 and 7 where it is fastened thereto at lower ends 12, 13. The transverse supporting configuration 9 is composed of a central cross-member 14 and lateral fastening brackets 15 and 16, both of which are connected to the lateral outer ends of the cross-member 14. The fastening brackets 15, 16 have the lateral ends 10 and 11 and the lower ends 12 and 13, respectively. Consequently, the fastening brackets 15, 16 are connected both to the side walls and to the engine cover located there below 4 or the bodywork portions 6, 7. In particular, a screw connection, as illustrated in FIG. 1, is provided for this connection. The roll bar configuration 8 can therefore be inserted as an installation part into the bodywork or the body shell of the motor vehicle.

Each fastening bracket 15, 16 has a receptacle 17 for the respective outer, lateral end of the cross-member 14. The receptacle 17 is adjoined in each case by a fastening arm 18 which, for example, is designed such that it runs obliquely downward and in the direction of the vehicle rear (not illustrated here). The outer and lateral ends of the fastening arm 18 form the respective ends 10 and 11 of the transverse supporting configuration 9 and are connected to the corresponding side wall 2, 3, as explained above. Starting from the receptacle 17 or from the fastening arm 18, a supporting foot 19 is also provided for each fastening bracket 15, 16, the supporting foot supporting the transverse supporting configuration or the roll bar configuration 8 downward, i.e. on the lid 4 or on the bodywork portions 6, 7 and being fastened there via its respective ends 12, 13. FIG. 2 illustrates the cross-member 14 in cross section. It is configured as a U-shaped profile 20 which therefore has a base 21 and upright profile walls 22 and 23 arranged at a distance from each other in the longitudinal direction of the vehicle (double arrow FL). Each receptacle 17 of the fastening brackets 15 and 16 is designed correspondingly so that the U-profile 20 of the cross-member 14 can be accommodated therein. Each receptacle 17 correspondingly has a receiving base (not illustrated) and upright receiving walls 24 (FIG. 1).

The base 21 could be configured at least partially as a double base 21', thus forming a hollow profile 21". In particular, the cross-member 14 could be equipped centrally with a double base of this type whereas there is only one base 21 laterally on the outside in the region of the receptacles 17. The rigidity of the cross-member 14 is thus increased and the latter may be a reinforcement member in the event of a side crash.

Roll bars 25, 26 (illustrated partially by dashed lines) which are mounted movably adjacent to the side walls 2, 3 are arranged on the transverse supporting configuration 9 or on the cross-member 14 and are mounted with respect to the lateral ends of the cross-member 14, i.e. adjacent to the fastening brackets 15 and 16, in respective pivot axes 27, 28, wherein the pivot axes 27 and 28 are oriented in the direction of the longitudinal direction FL of the vehicle. The right roll bar 26 is shown in a retracted inoperative position RS whereas the left roll bar 25 is shown (in a solid line) in a protective position ST. In the inoperative position RS, the roll bars 25 and 26 are located within a U profile 20, i.e. between the profile walls 22 and 23. The roll bars 25 and 26 are either completely accommodated here by the U profile 20 or protrude over the latter only slightly, as illustrated in FIG. 1. The portions of the roll bars 25, 26 which are accommodated within the profile of the cross-member 14 are illustrated by dashed lines whereas the portions which protrude over the profile can be seen by a solid line. It is also clear in the case of the roll bar 26 from FIG. 1 that the roll bar, in the folded-in or retracted inoperative position RS thereof, scarcely protrudes over an upper end 29 of the side wall. In the protective position ST which is shown for the roll bar 25, the erected roll bar 25 clearly protrudes over the upper end 29 of the side wall 2.

It can also be clearly seen in the inoperative position RS that the roll bar 26 comes to lie above the pivot axis 28 thereof. However, it would also be conceivable for the roll bar to be located level with the pivot axis 28 in the inoperative position. The inoperative position RS of the roll bars 25 and 26 is furthermore oriented approximately horizontally, which can be seen at the roll bar 26.

Each roll bar has a peripheral, self-contained contour 30, preferably with a central opening 31. Furthermore, each roll bar 25, 26 has a bar foot 32 which has a downwardly directed extension 33 (with reference to the inoperative position RS of the roll bar 26) which is penetrated by the pivot axis 27 or 28. The contour 30 of the roll bar 25, 26 is also distinguished by a lower bar portion 34—with reference to the inoperative position RS—which is of rectilinear design and, in the inoperative position RS, is located adjacent to the base 21 of the U profile 20. The rectilinear portion 34 is covered by a further bar portion 35 which is configured in an arcuate manner. In the inoperative position RS, the roll bars 25, 26 could also lie with the lower bar portion 34 thereof level with the pivot axes 27, 28.

If the roll bars 25 and 26 are in the protective position ST, each bar foot 32 is supported with a substantially flat stop surface 36 on the base 21 of the U profile 20 or on the base of the receptacle 17. In the protective position ST, the pivot angle is correspondingly set fixedly by the profile of the stop surface 36. In addition, the outer bar portion 35 (shown for the roll bar 25) can be supported on a side surface 37 of the receptacle 17. The protective position ST of the roll bars 25, 26 is therefore set fixedly. So that the roll bars 25, 26 are secured at least in the fully extended protective position ST, a locking device 38 is provided for each roll bar 25, 26, the locking device having a shiftable blocking element 39 which permits the roll bars to be erected into the protective position ST and prevents the roll bars from pivoting back in the direction of the inoperative position RS. The blocking element 39 can be designed, for example, as a blocking bolt. Consequently, the protective position ST for the roll bars 25, 26 is secured by the bar foot 32 being supported on one side on the base 21 of the U profile 20 and by the bar portion 35 optionally bearing against the side surface 37 and the blocking element 39 preventing pivoting back in the direction of the inoperative position RS.

In a further exemplary embodiment, the roll bar 25 (shown by chain-dotted lines) is illustrated in the protective position ST. The roll bar 25 with a solid line is located approximately upright and has, for example, passed through a pivot angle of up to 90° between the inoperative position RS and the protective position ST whereas the roll bar 25, which is illustrated by chain-dotted lines, is shifted into a different protective position ST which takes up an over-rotated angular position UT. Starting from the approximately horizontal inoperative position RS, the pivot angle of the roll bar here as far as the over-rotated angular position UT is more than 90°. In the over-rotated angular position UT, the roll bar 25 or 26—with reference to an imaginary vertical—is pivoted further outward in the direction of the adjacent vehicle wall 2, 3 thereof, i.e. is over-rotated with reference to the imaginary vertical. So that the over-rotated angular position UT can be taken up as the protective position ST, the stop surface 36 on the bar foot can be correspondingly configured and the side surface 37 of the receptacle 17 can optionally be shifted outward further in the direction of the respective side wall 2, 3 or optionally can also be omitted.

The motor vehicle 1 with the roll bar configuration 8 is configured in particular as a central engine vehicle or rear engine vehicle, i.e.—with respect to the longitudinal direction FL of the vehicle—the engine compartment 5 is arranged behind the vehicle interior (not illustrated here) such that the roll bar configuration 8 can be arranged above the engine compartment 5 or, for example, between the engine compartment 5 and the vehicle interior (not illustrated here).

The invention claimed is:

1. A roll bar configuration for a motor vehicle, the roll bar configuration comprising:
   a cross-member;
   pivot axes disposed—as seen in a direction of a width of the motor vehicle—at a distance from each other on said cross-member; and
   two roll bars mounted on said cross-member via said pivot axes, each of said roll bars formed as a single part and so as to be stiff per se and can be shifted from a retracted inoperative position into an erected protective position about said pivot axes, said roll bars disposed in the inoperative position—as seen in a vertical direction of the motor vehicle—substantially level with said pivot axes or on said cross-member there above.

2. The roll bar configuration according to claim 1, wherein said roll bars have a peripheral, self-contained contour.

3. The roll bar configuration according to claim 1, wherein—as seen in the inoperative position—each of said roll bars has a lower bar portion with a rectilinear configuration and an upper bar portion shaped in an arcuate manner.

4. The roll bar configuration according to claim 1, wherein:
   said cross-member is configured in cross section as a U-shaped profile having a base; and
   said roll bars each have a bar foot and in the protective position, each of said roll bars is supported by said bar foot on said base of said U profile.

5. The roll bar configuration according to claim 1, further comprising a locking device for securing said roll bars, at least in the protective position, against pivoting in a direction of the inoperative position.

6. The roll bar configuration according to claim 1, wherein a pivot angle for each of said roll bars between the inoperative position and the protective position is >90[deg.].

7. The roll bar configuration according to claim 1, wherein in the protective position, each of said roll bars takes up an over-rotated angular position pointing in a direction of an adjacent side wall of the motor vehicle.

8. The roll bar configuration according to claim 1, further comprising lateral fastening brackets each fastened laterally on an outer side of said cross-member and serve to connect the roll bar configuration to the motor vehicle.

9. A motor vehicle, comprising:
   a vehicle interior;
   a receiving space disposed behind said vehicle interior;
   a lid for said receiving space; and
   a roll bar configuration disposed above said lid, said roll bar configuration containing:
   a cross-member;
   pivot axes disposed—as seen in a direction of a width of the motor vehicle—at a distance from each other on said cross-member; and
   two roll bars mounted on said cross-member via said pivot axes, each of said roll bars formed as a single part and so as to be stiff per se and can be shifted from a retracted inoperative position into an erected protective position about said pivot axes, said roll bars disposed in the inoperative position—as seen in a vertical direction of the motor vehicle—substantially level with said pivot axes or on said cross-member there above.

10. The motor vehicle according to claim 9, wherein said receiving space is an engine compartment.

11. The motor vehicle according to claim 10, wherein said cross-member of said roll bar configuration runs above said engine compartment.

* * * * *